Oct. 14, 1924.

L. C. LAZEAR

STEERING WHEEL

Original Filed April 5, 1919

1,511,227

Witness:
Harry S. Gaither

Inventor.
Leroy C. Lazear

Patented Oct. 14, 1924.

1,511,227

UNITED STATES PATENT OFFICE.

LEROY C. LAZEAR, OF CHICAGO, ILLINOIS.

STEERING WHEEL.

Application filed April 5, 1919, Serial No. 287,866. Renewed July 6, 1922. Serial No. 573,188.

*To all whom it may concern:*

Be it known that I, LEROY C. LAZEAR, a citizen of the United States, residing at Chicago, in the county of Cook and State of Illinois, have invented certain new and useful Improvements in Steering Wheels, of which the following is a specification.

This invention has to do with steering wheels for automobiles, motor boats, etc., and is specially concerned with means for interlocking the wheel to the post having connection with the steering apparatus, and with means by which this interlocking connection may be disestablished to render the steering wheel inoperative.

Various forms of steering wheel locks for automobiles and the like have heretofore been devised, usually involving the attachment of certain unsightly parts to the steering wheel or to the post upon which it is mounted. Such steering wheel locks, furthermore, are ordinarily complicated, and not uniformly effectual, so that they perform inadequately their intended function. In addition to these disadvantages, it is usually not difficult for an unauthorized person to pick or tamper with the locks so provided, in consequence of which no real protection is afforded.

My improved steering wheel provides a connection with the post which is entirely concealed so that the wheel remains substantially the same in appearance as others commonly in use; it includes means, however, by which the wheel may be readily rendered operative or inoperative as desired. It is, furthermore, simple and positive in its action, and retains within its own body practically all the operative elements necessary to effect the desired locking and unlocking actions. For these as well as other reasons, it is practically immune from tampering. The steering wheel of this invention, moreover, may be attached to the ordinary steering post without requiring special parts or accessories, and is, furthermore, adapted, without modification, for attachment to posts of different size and shape, in consequence of which it may be supplied as an ordinary adjunct to the standard kinds of steering apparatus now employed in automobiles, motor boats, and the like. These and other objects of my invention will more fully hereinafter appear from the specification and claims, and from the accompanying drawing in which—

Inasmuch as the parts special to this invention are all located in the central portion of the wheel, I have thought it sufficient to illustrate only this portion. Accordingly there is shown the inner ends of the wheel spokes which may conveniently be four in number, designated as A, B, C, and D. It will be understood that these spokes extend outwardly from the center as far as desired to support a circular rim. The wheel is adapted for operative connection with a hub 10 which is suitably formed for attachment to the upper end of a steering post 11. At this point, it may be mentioned that the wheel and hub in their relation to each other may be always the same, but, owing to the diversity of shapes and sizes of steering posts with which the wheel may be used advantageously, the hub in its relation to each such post should be varied properly to connect therewith. In other words, the present wheels constructed to a standard size and design may be adapted to practically any form of steering post by the use of a proper hub.

Figure 2:
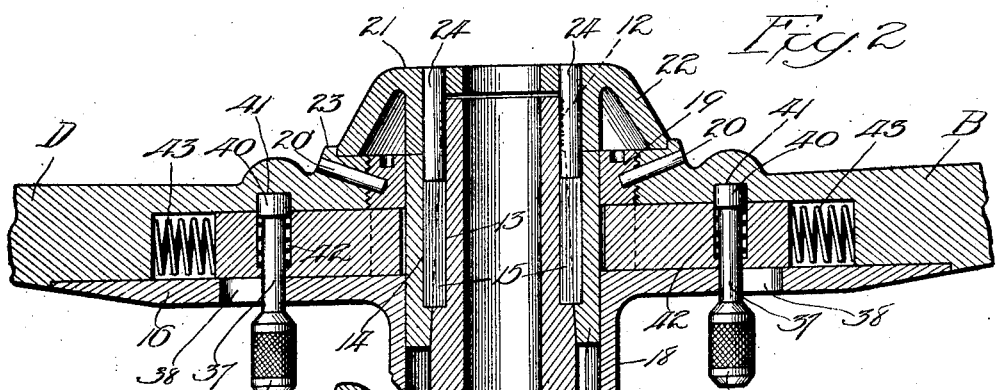
Fig. 2 is a cross section therethrough, taken on line 2—2 of Fig. 1.

The post shown in Fig. 2 may be of standard construction with a tapered upper end, the angle or length of such taper being of relative unimportance. Upon the extremity of the post, I provide threads 12 below which are formed one or more slots 13 having an increasing depth caused by making the bottom of the slot parallel to the axis of the post. The hub 10 which is arranged to fit upon the post so formed is tapered interiorly in comformity therewith, and is provided with one or more slots 14 complementary to the slots 13, so that a key 15 may be received therein to lock the hub non-rotatably to the post.

It will be noted that the several spokes of the wheel merge into a central portion which is hollowed to provide a space for the reception of the locking elements that will presently be described. This space by preference opens onto the under side of the wheel to facilitate its manufacture and assembly, but in completed condition is closed by means of a spider plate 16 suitably secured in place with rivets 17 or other appropriate devices. Adjacent the hub the wheel center is formed with a flange 18 which preferably depends below the lower end of the hub in protecting relation thereto. The upper side of the wheel center terminates short of the hub at which place a ring 19 is connected therewith, preferably by threads, pins 20 being employed to lock the ring in place. Threaded upon the upper end of the post is a cap 21 in the nature of a nut having its sides 22 preferably smooth and oblique so as to resist torsional engagement with a wrench or other similar instrument. Preferably an annular shoulder 23 is formed on the wheel as shown, in surrounding relation to the lower edge of the cap so as to prevent insertion of an instrument thereunder. The cap is formed with one or more holes in register with the keys 15 each capable of receiving a pin 24 which may be driven to position over the key to prevent removal of the latter. By this construction it will be noted that the cap is locked non-rotatably upon the post.

Figure 1:
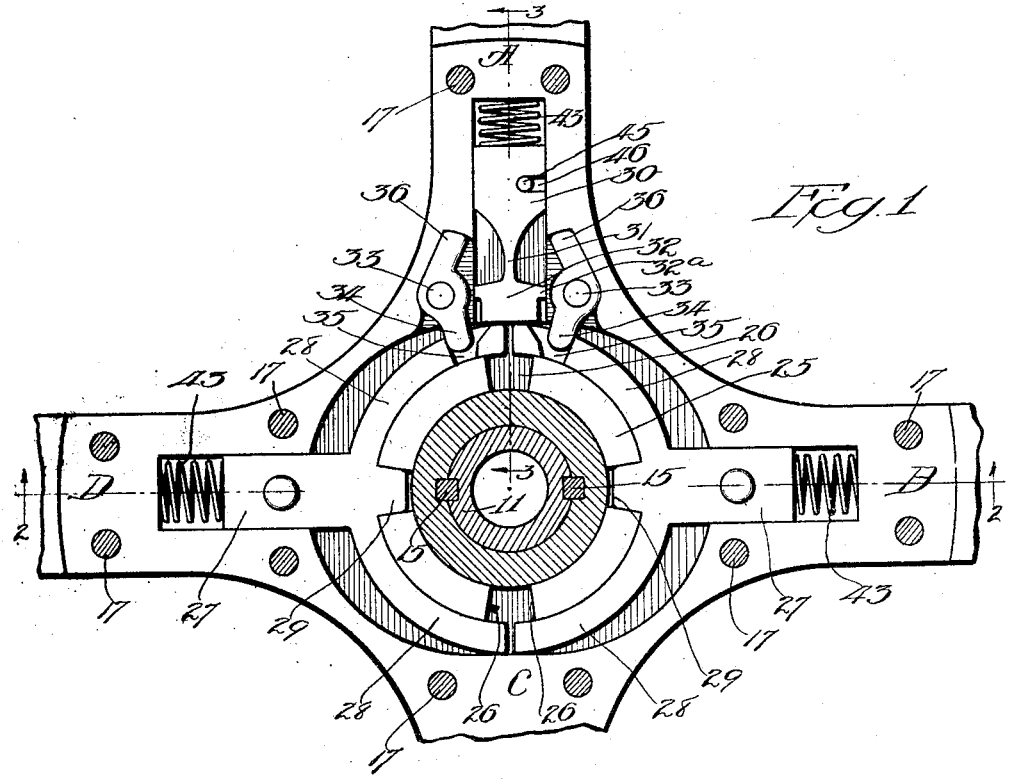
Figure 1 is a view looking toward the under side of the central portion of a steering wheel constructed in accordance with my invention, the spider plate being removed to exhibit the interior parts.

The means for locking the wheel to the post include an annular rib or shoulder 25 formed on the hub in a plane coincident with the chamber interiorly of the wheel, this rib having notches or recesses 26 at desired places, each notch, by preference, being slightly tapered in the direction of the wheel center. Other means co-operating with these notches are movably arranged within the wheel chamber and, in the form shown, consist of two similar clutch plates 27, one arranged within each of two opposite spokes such as B and D. Each clutch plate is formed with a pair of bow-shaped arms 28 having a curvature corresponding closely to that of the rib 25, a tapered head 29 being projected centrally between the arms in position to enter one of the notches 26, as shown in Fig. 1. Preferably each head 29 is of such size as to enter almost, but not entirely, within any of the notches 26, so as to avoid loose play, and allow for wear such as results from usage. With this arrangement of the parts, the extremities of the bow arms lie in proximate relation in the vicinity of the spokes A and C.

Within the spoke A I have arranged a slidable bolt 30 whose retractive movements are governed by a key-controlled lock which will presently be described. This bolt which is in the form of a plate has a neck 31 upon which is carried a head 32 having shoulders 32ª, the head being adapted to abut the proximate ends of the bow arms 28 when the clutch plates are engaged with the hub, as shown in Fig. 1.

It is intended that this bolt 30 shall have capacity for movement toward the wheel center sufficiently to present its head 32 between the proximate ends of the bow arms 28 when the clutch plates 27 are withdrawn from locking position, the shoulders 32ª engaging with the arms to prevent the head from contacting with the hub. These movements of the clutch plates, however, may not be made with entire independence of the bolt 30 owing to the provision of a pair of bell cranks which are pivoted as at 33, each being arranged to present one arm 34 within a notch 35 formed in the proximate bow arm, and to swing its other arm 36 within the space adjacent the head 32 of the bolt 30. It will be noted that a similar bell crank is provided for each of the clutch plates, one operating on each side of the bolt 30, so that the movements of the clutch plates are, therefore, rendered simultaneous and always toward or from each other.

For retracting and disengaging the clutch plates from the hub, so that the wheel will be free to revolve idly upon the post, I have provided in each plate 27 a locking pin 37 extended through a slot 38 in the spider plate and carrying a handle portion 39 on the underside of the wheel. These pins are arranged for up and down movements in their respective clutch plates, each being provided with a head 40 adapted to enter within a socket 41 formed in the upper part of the wheel, a coil spring 42 acting to normally maintain each pin 37 in locking position so as to prevent accidental retraction of the clutch plates. A spring 43 may further be provided rearwardly of each clutch plate by which means these plates tend always to remain in locking relation with the hub.

From the description thus far given, it will be understood that the operation of unclutching the wheel from the post requires merely that the two pins 37 be pulled downwardly to unlocking position following which the clutch plates are manually retracted outwardly until their heads 29 no longer engage with the hub. During this operation, the bell cranks are swung around so as to move their arms 36 close to the head 32 of the bolt 30; but, prior to abutting therewith, the extremities of the bow arms 28 will have separated sufficiently to allow the bolt 30 to snap in between them under the influence of a spring 43. With the parts in this relation, the clutch plates cannot normally be advanced towards the hub, so that the wheel is inoperative upon the post, being free to revolve idly thereupon.

Figure 3:
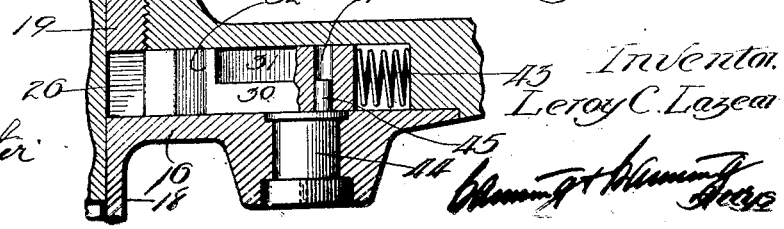
Fig. 3 is a detail in cross section taken on line 3—3 of Fig. 1.

Means operable by a suitable key are provided for retracting the bolt 30 from its advanced position between the bow arms so that the clutch plates may slide normally into locking relation with the hub. As a simple assembly of parts for this purpose, I have shown in Fig. 3 a rotatable cylindrical lock 44 having the usual slit for the entry of a proper key, this lock being positioned within the spider plate, as shown. A connection between this lock and the bolt 30 is provided in the pin 45 located eccentrically of the axis of the lock, and disposed within a slot 46 formed in the bolt 30, the arrangement being such that when the lock is rotated under the influence of the proper key, it will cause the bolt 30 to move with it.

By the use of some such means as has been described, a person having the proper key may retract the bolt 30 from between the clutch plates, permitting the latter to snap forwardly into engagement with the hub; and by slight rotation of the wheel two of the notches 26 will align with the heads 29 of the clutch plates, thus completing the locking operation. The two bell cranks provide a positive means of drawing together the two clutch plates if the springs 43 should fail in their operation, it being merely necessary that the bolt 30 be retracted slightly further than its normal position shown in Fig. 1, in order that its head may have engagement with the arms 36 of each bell crank such as to exert a pulling effect upon the clutch plates.

The structure of the present steering wheel is such as to make it difficult, if not impossible, to tamper or pick the locking elements. It is only by laborious effort that the spider plate may be removed, due to the permanent character of the fastenings employed, or that the cap 21 may be unscrewed and the ring 19 taken out so as to permit access to the interior of the wheel. While the obstacles in the way of removing the wheel from the post are almost insurmountable, the operation of initially installing the wheel is very simple. Prior to attaching the wheel in place the ring 19 and cap 21 are not permanently secured to the wheel, but are loose so as to permit the wheel to be first placed over the post, followed by the hub which is then locked thereto, after which the wheel is drawn up to proper position and the exterior parts secured permanently in place.

I claim:

1. A steering wheel embodying, in combination, spokes merging centrally of the wheel in which is an axial opening and a surrounding chamber containing movable locking elements, a hub for the wheel formed separately therefrom and wholly contained within the axial opening, the hub being formed to interlock with a steering post, means formed on the hub with which the locking elements may engage to establish a non-rotatable connection between the wheel and hub, a plate arranged centrally of the wheel on one side thereof and removable from the wheel to permit the locking elements to be assembled therein, means for permanently securing the plate upon the wheel, whereby a seal is provided against tampering with the parts therein, and means on the opposite side of the wheel removable therefrom permitting the hub to be withdrawn from the wheel preliminary to its interlock with the steering post, substantially as described.

2. In a steering wheel having an axial opening adjacent which is a chamber extending interiorly into certain of the wheel spokes, the combination of a hub formed separately therefrom and wholly contained within the axial opening, means for locking the wheel and hub against relative rotation comprising a clutch member slidably arranged within one of the wheel spokes and adapted to present its acting end against the hub, the hub being suitably notched to receive the acting end of the clutch plate, the clutch plate having bow-arms in encircling relation to the hub terminating adjacent other of the wheel spokes, and a slide bolt in proximity to the end of one of said bow-arms having spring means for normally advancing said bolt toward the wheel center, and adapted when the clutch plate is withdrawn from engaging position with the hub to occupy a position in advance of the bow-arm whereby the clutch plate is prevented from interlocking with the hub, substantially as described.

3. In a steering wheel having an axial opening adjacent which is a chamber formed interiorly of the wheel, the combination of a hub formed separately therefrom and wholly contained within the axial opening, and means for locking the wheel against rotation relative to the hub comprising a clutch plate arranged within the chambered portion of the wheel having an acting end adapted to engage with the hub, the hub being suitably notched to receive the acting end of the clutch plate, and means for retracting the clutch plate from engaging relation with the hub comprising a pin arranged within the clutch plate but adapted to present a portion of itself within a recess provided in the wheel, the pin having spring means for normally maintaining itself in a locking relation within the recess whereby the clutch plate is prevented from disengaging from the hub, the pin having means extended exteriorly of the wheel adapted for manual operation whereby the pin may be retracted from locking position preliminary to retracting the clutch plate from engaging relation with the hub, substantially as described.

4. In a steering wheel having an axial opening adjacent which is a chamber formed interiorly of the wheel, the combination of a hub formed separately therefrom and wholly contained within the axial opening, means for establishing an interlocking connection between the wheel and hub consisting of a slidable clutch plate arranged within the wheel chamber and adapted to engage with the hub, the hub being suitably recessed to receive the acting end of the clutch plate, the clutch plate being provided with a bow-arm partially encircling the hub and terminating adjacent one of the wheel spokes, a slide bolt in said wheel spoke having spring means for normally projecting itself in the path of return movement of the bow-arm when the clutch plate is retracted, and a loose connection between the slide bolt and bow-arm consisting of a bell-crank pivoted to the wheel and having its arms in loose engagement one with the bolt and one with the bow-arm, the slide bolt when retracted co-operating with the bell crank lever for positively moving forward the clutch plate into locking relation with the hub, substantially as described.

5. In a steering wheel having an axial opening adjacent which is a chamber formed interiorly of the wheel, the combination of a hub formed separately therefrom and wholly contained within the axial opening, means within the chambered portion of the wheel adapted to engage with the hub for interlocking the wheel therewith, a ring removably secured to the wheel side adjacent its center adapted to retain the hub within the axial opening, and means preventing access to said ring comprising a cap arranged in covering relation thereto and in immovable relation to the wheel, substantially as described.

6. In a steering wheel having an axial opening adjacent which is a chamber formed interiorly of the wheel, the combination of a hub formed separately therefrom and wholly contained within the axial opening, means within the chambered portion of the wheel adapted to engage with the hub for interlocking the wheel therewith, the hub having a central aperture tapered in conformity with the end of a steering post to which it is adapted for connection, the connection between the post and hub comprising a key inserted into a slot formed of two complementary registering portions, one in the post and the other in the hub, a ring secured upon the wheel side adjacent its center for retaining the hub in operative relation to the wheel, a cap overlying the ring to bar access thereto, the cap having a threaded connection with the post and being formed with an opening in alignment with the key, and a pin driven into said opening and in abutting relation with the key whereby the cap is interlocked to the post and the wheel, substantially as described.

7. In a steering wheel having an axial opening adjacent which is a chamber formed interiorly of the wheel, the combination of a hub formed separately therefrom and wholly contained within the axial opening, means within the wheel for engaging with the hub to lock the wheel thereto comprising a clutch plate adapted to move toward and from the wheel center and having a head arranged to enter a notch formed in the hub, a spring tending to hold the clutch plate in engaging relation with the hub, a pin carried by the plate and having spring means for normally projecting the pin into a socket formed in the wheel whereby the clutch plate is withheld against retraction from the hub, means exteriorly of the wheel for withdrawing the pin from locking position and thereafter withdrawing the clutch plate from engagement with the hub, and other means arranged to engage with the clutch plate when retracted to prevent its re-engagement with the hub, the disengaging movements of said latter means being key-controlled, substantially as described.

8. In combination with a steering post having a tapered portion near its end, a steering wheel arranged for operative connection with the post and comprising a hub formed separately from the wheel and wholly contained within an opening formed axially of the wheel, the hub being provided with a tapered opening adapted to fit upon the post, there being complementary slots formed in the hub and post and a key inserted in said slots to lock the hub upon the post, means within the wheel adapted to engage with the hub for interlocking the wheel thereto, and a cap for the wheel having a threaded connection with the post, the cap being formed with an opening in register with the key and having a pin in said opening abutting the key whereby the cap is non-rotatably secured in place, substantially as described.

LEROY C. LAZEAR.

Witness:
EPHRAIM BANNING.